J. T. ADAMS.
FORAGE BLADE.
APPLICATION FILED MAR. 7, 1918.
1,323,237.
Patented Dec. 2, 1919.
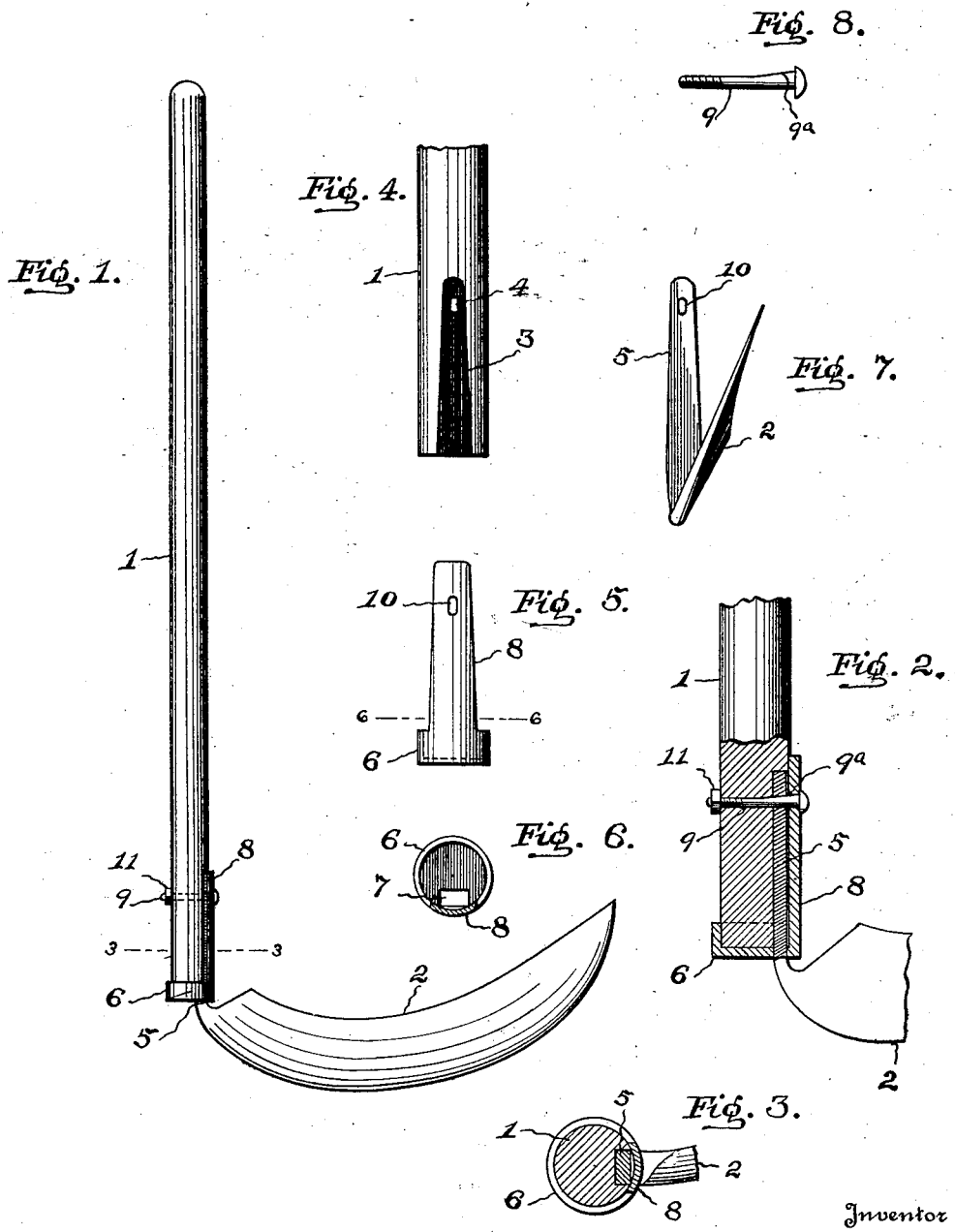
Inventor
J. T. Adams.
By H. S. Hill
Attorney

UNITED STATES PATENT OFFICE.

JOHN T. ADAMS, OF REYNOLDS, GEORGIA.

FORAGE-BLADE.

1,323,237.      Specification of Letters Patent.      Patented Dec. 2, 1919.

Application filed March 7, 1918. Serial No. 220,956.

*To all whom it may concern:*

Be it known that I, JOHN T. ADAMS, a citizen of the United States, residing at Reynolds, in the county of Taylor, State of Georgia, have invented a new and useful Forage-Blade; and I do hereby declare the following to be a full, clear, and exact description of the invention, such as will enable others skilled in the art to which it appertains to make and use the same.

The present invention relates to a forage blade, and more particularly to a novel means for attaching the blade to the handle, the object of the invention being to provide a handle fastening means which enables a blade or similar member to be rigidly fastened to the end of a wooden handle without difficulty and without danger of splitting the handle.

Further objects of the invention are to provide a handle fastening means which is comparatively simple and inexpensive in its construction, which admits of the blade being detached from the handle or applied thereto without difficulty, and which provides for drawing the parts firmly together and taking up all looseness when the fastening bolt is tightened.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a side elevation of a forage blade in which the blade is secured to the handle by a fastening means embodying the invention.

Fig. 2 is an enlarged detail view of the lower end of the handle and a portion of the blade, parts being shown in section to illustrate more clearly the details of construction.

Fig. 3 is an enlarged transverse sectional view through the handle on the line 3—3 of Fig. 1.

Fig. 4 is an enlarged view of the lower end of the handle with the fastening means removed therefrom.

Fig. 5 is a detail view of the cap member.

Fig. 6 is a horizontal sectional view on the line 6—6 of Fig. 5.

Fig. 7 is a detached view of the blade and tang, and

Fig. 8 is an enlarged detail view of the fastening bolt.

Corresponding and like parts are referred to in the following description and indicated in all the views of the drawings by the same reference characters.

For the purpose of illustration the invention is shown as applied to a forage blade which is adapted to be employed by hand for cutting corn stalks and the like, the numeral 1 designating the wooden handle thereof, and 2 the blade which projects from one end of the handle at substantially right angles thereto. The lower end of the wooden handle 1 is provided in one side thereof with a depressed seat 3 which extends longitudinally from the end of the handle. This depressed seat preferably tapers in width toward the upper end thereof, and communicates with a transverse bolt receiving opening 4. The inner end of the blade 2 is formed with an integral tang 5 which is tapered in a manner corresponding to the seat 3 and is adapted to fit accurately within the seat. A flanged cap plate 6 fits over the end of the handle 1, being provided in the bottom thereof with an opening 7 to receive the shank 5 of the blade, and being formed at one side with a tang 8 which extends along the side of the handle, fitting over the shank 5 and covering the grooved seat 3 of the handle. A transverse bolt 9 extends through the opening 4 of the handle and also through elongated openings 10 in the shank 5 and tang 8. A nut 11 is adapted to be screwed upon the end of the bolt 9, and one side of the bolt may be provided with an inclined portion $9^a$ which is adapted to engage the upper ends of the openings 10 in the shank 5 and tang 8 to draw the shank firmly into the grooved seat 3 and draw the cap 6 tightly against the end of the handle. The tang 5 is thus firmly wedged in position, and the cap 6 drawn securely in place so that all looseness is taken up and a rigid construction obtained.

Having thus described the invention, what I claim as new and desire to secure by Letters Patent, is:—

The combination with a handle having a tapered grooved seat extending longitudinally inwardly from one end thereof, of a tool provided with a shank which fits accurately within the grooved seat and is correspondingly tapered, a flanged cap fitted over the end of the handle and formed with an opening to receive the shank, said cap being also formed with a rearwardly extending tang which extends over the shank and covers the grooved seat, and a bolt extending transversely through the handle, tang and shank and formed with a beveled side arranged to have a cam action on the shank and tang for moving them longitudinally upon the handle to wedge the shank in the grooved seat and draw the cap against the end of the handle.

In testimony whereof I have signed my name to this specification in the presence of two subscribing witnesses.

JOHN T. ADAMS.

Witnesses:
 D. R. BIGBIE,
 MARY E. NEISLER.